United States Patent [19]

Smith et al.

[11] 3,723,520

[45] Mar. 27, 1973

[54] PROCESS FOR THE PREPARATION OF 1-HALOPHOSPHOLENES

[75] Inventors: Curtis P. Smith, Cheshire; Henri Ulrich, North Branford, both of Conn.

[73] Assignee: The Upjohn Company, Kalamazoo, Mich.

[22] Filed: June 1, 1971

[21] Appl. No.: 148,997

[52] U.S. Cl. ..............................260/543 P, 260/936
[51] Int. Cl. ............................................C07d 105/02
[58] Field of Search ..................................260/543 P

[56] References Cited

UNITED STATES PATENTS 2,685,602   8/1954   Woodstock et al. ..............260/543 P

FOREIGN PATENTS OR APPLICATIONS 1,011,974   12/1969   Great Britain ....................260/543 P 210,155   2/1968   U.S.S.R..........................260/543 P

*Primary Examiner*—Lorraine A. Weinberger
*Assistant Examiner*—Richard D. Kelly
*Attorney*—Denis A. Firth, John Kekich and Joseph T. Eisele

[57] ABSTRACT

A conjugated diene and a member of the group consisting of phosphorus trichloride, phosphorus tribromide and phosphorus triiodide are reacted together with white phosphorus in the presence of a compound which will inhibit polymerization of the conjugated diene; to prepare the corresponding 1-halophospholenes. The products of the process are novel compounds, useful as intermediates in the preparation of selective solvents and catalyst for the preparation of carbodiimides from isocyanates.

20 Claims, No Drawings

PROCESS FOR THE PREPARATION OF 1-HALOPHOSPHOLENES

BACKGROUND OF THE INVENTION

1. Field of the Invention

The invention is concerned with a process for preparing heterocyclic phosphorus compounds, and is more particularly concerned with a process wherein a conjugated diene is reacted with a phosphorus trihalide to prepare the corresponding 1-halophospholene.

2. Description of the Prior Art

Processes for preparing 1-halophospholene compounds were not known prior to our invention. Subsequent to our invention, a process was described (Quin et al., J. Am. Chem. Soc., 92, 5779, 1970; Myers et al., J. Org. Chem. 36, 1285–90, 1971) for the preparation of 1halophospholenes.

By the process of our invention, the desired 1-halophospholene compounds are prepared in one step, directly from the corresponding conjugated diene.

SUMMARY OF THE INVENTION

The invention comprises a process which comprises reacting
A. a conjugated diene capable of undergoing the Diels-Alder reaction;
B. a phosphorus trihalide selected from the group consisting of phosphorus trichloride, phosphorus tribromide and phosphorus triiodide; and
C. white phosphorus;
at a temperature of about 25° C to reflux temperature in the presence of a compound which will inhibit the polymerization of said conjugated diene (A); to obtain the corresponding 1-halophospholene.

The products of the process are, for the most part, novel compounds, useful as intermediates in a variety of syntheses. For example, the products of the process may be used in preparing selective solvents and catalysts for the preparation of carbodiimides from isocyanates. Methods of preparing useful compounds from the products of the process are discussed in more detail hereinafter

DETAILED DESCRIPTION OF THE INVENTION

The conjugated diene reactant employed in the process of the reaction may be any of those conjugated dienes which will undergo the well known Diels-Alder reaction. Conjugated dienes capable of undergoing Diels-Alder reactions are well known and discussed in the text Newer Methods of Preparative Organic Chemistry by Kurt Alder, Interscience Publishers Inc. (1948), in the chapter "The Diene Synthesis" beginning on page 331. A brief discussion of such conjugated dienes may also be found in the U.S. Pat. No. 2,663,737. Preferred dienes employed in the process of the invention are those having the general formula:

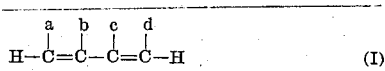

(I)

wherein a, b, c and d are each selected from the group consisting of hydrogen, halogen, alkoxy of one to six carbon atoms, inclusive, phenoxy, hydrocarbyl and halogen substituted hydrocarbyl; said hydrocarbyl having one to six carbon atoms inclusive.

The term "hydrocarbyl" as used herein means the monovalent radical obtained by removing one hydrogen atom from the parent hydrocarbon, which latter contains one to six carbon atoms. Illustrative of such hydrocarbyl groups is alkyl of one to six carbon atoms, inclusive such as methyl, ethyl, propyl, butyl, pentyl and hexyl including isomeric forms thereof; alkenyl of two to six carbon atoms, inclusive, such as vinyl, allyl, butenyl, pentenyl, hexenyl including isomeric forms thereof; and phenyl.

The term "halogen" is used throughout this specification and claims in its generally accepted sense as embracing chlorine, bromine, iodine, and fluorine.

The term "halogen substituted hydrocarbyl" means those hydrocarbyl groups as before defined wherein from one to all of the hydrogen atoms have been replaced by halogen as defined above. Illustrative of halogen substituted hydrocarbyl are chloromethyl, trichloromethyl, 2-chloroethyl, 2-bromoethyl, 1-chlorobutyl, 2-bromohexyl, 2-chlorobutenyl, 1,1,1-trifluorohexenyl, p-chlorophenyl 2,5diiodophenyl and the like.

The term "alkoxy of one to six carbon atoms, inclusive," means the radical represented by the formula —0—R wherein R is alkyl of one to six carbon atoms, inclusive, as defined above. Illustrative of alkoxy of one to six carbon atoms, inclusive, are methoxy, ethoxy, propoxy, butoxy, pentyloxy and hexyloxy including isomeric forms thereof;

Conjugated dienes of formula (I) are for the most part well known compounds. They may be prepared by a variety of well known methods, illustrated, for example, by the method of Makin et al., Zhur. Obschchei Khim., Vol. 30, pps. 3276–80 (1960) and those methods discussed in E. H. Rodd, Elsevier Publishing Co., N.Y., (1951) Vol. II, pps. 267–9. The halogen-substituted conjugated dienes may be prepared by substitution halogenation of the corresponding non-halogengated compound using known methods; see for example E. H. Rodd, supra pps. 274–84.

Mixtures of conjugated dienes as above defined may also be employed in the process of the invention to prepare the corresponding mixture of 1-halophospholenes. It is also not necessary that the conjugated dienes used in the process of the invention have any particular degree of purity. For example, crude mixtures of such conjugated dienes are obtainable as by-products in the commercial cracking of gas oil. Such mixtures generally contain impurities comprising non-conjugated dienes, alkenes, alkanes and the like. Such crude mixtures may be employed in the process of the invention, and the 1-halophospholene products are then obtained in a corresponding crude mixture, from which they may be isolated by distillation, countercurrent extraction, chromatographic and like techniques when desired.

Using the formula (I) as an illustration of those conjugated dienes which may be employed in the process of the invention, the course of the reaction may be represented schematically by the equation:

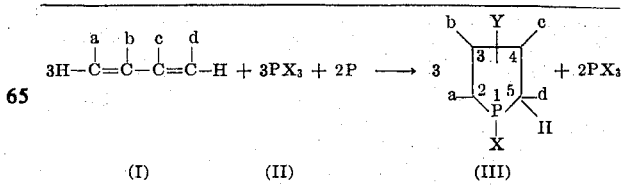

(I)     (II)     (III)

The products of the process are 1-halophospholenes, as illustrated by compounds of the formula (III) in the above equation. The broken line is present in formula (III) to show that the product of the process of the invention can exist in two structural isomeric forms, that is the 2-phospholene and the 3-phospholene isomeric forms. Reference hereafter to the 1-halophospholenes obtained by the process of the invention is intended to embrace both the 2- and the 3- isomers unless otherwise stated. Under certain process conditions, to be described hereinafter, both isomeric forms are obtained in admixture. Both isomers are useful, and for many purposes may be used in admixture. When desired, however, they are readily separated by conventional techniques such as fractional distillation, chromatographic separation, countercurrent extraction and like techniques.

The process of the invention is carried out by admixing the conjugated diene reactant with the phosphorus trihalide and white phosphorus in the presence of a compound which will inhibit polymerization of the diene reactant. The reaction between white phosphorus, the diene and the phosphorus trihalide is advantageously assisted by continually stirring the reaction mixture during the course of the reaction. Conventional apparatus and techniques for mixing may be used in the process.

The reactant diene, phosphorus trihalide (II) and white phosphorus are employed in approximately stoichiometric proportions making due allowance for the fact that phosphorus trihalide is generated during the course of the reaction. That is, the diene reactants and phosphorus trihalide (II) are employed in molar proportions of 3:1. The white phosphorus is employed in a proportion of two-thirds of a mole for every mole of diene reactant.

In a preferred embodiment, admixture of the reactants is carried out in an inert organic solvent. An inert organic solvent as used in the preferred process of the invention is one which does not itself enter into the reaction with any of the reactants or otherwise interfere with the desired course of the reaction. Examples of such inert solvents are benzene, toluene, xylene, petroleum ether, n-hexane, cyclohexane, methylene chloride, chloroform, carbon tetrachloride, 1,2-dichloroethane and the like. Benzene is the preferred solvent. The proportion of solvent employed is not particularly critical. However, the solvent is employed advantageously in quantities sufficient to provide a concentration of the conjugated diene reactant in the initial reaction mixture of about 5 to about 95 percent by weight. Preferably, the concentration of diene in the initial reaction mixture is from about 20 to about 80 percent by weight.

It is necessary that there be present in the reaction mixture, a compound which will prevent polymerization of the diene reactant. Such compounds are well known and readily available; see for example U.S. Pat. No. 2,663,736; U.S. Pat. No. 2,663,737; Belgian Pat. No. 631,416 and McCormack, Org. Syn. Vol. 43, pg. 73 (1963). Examples of such polymerization inhibitors are methylene blue, rhodamine, phenothiazine, n-phenyl-1-phenylazo-2-napthanilamine, 2,6-di-tert-butyl-p-cresol; copper salts such as copper stearate, copper napthenate, cuprous chloride and cuprous iodide; and polynitro compounds such as trinitrobenzene, dinitrobenzene, trinitrotoluene and the like. Generally, the proportion of polymerization inhibitor used is from about 0.1 percent to about 2.0 percent based on weight of the reaction mixture.

Although the process is ordinarily carried out at atmospheric pressure, higher pressures will assist reaction, particularly when the conjugated diene reactant has bulky side chain substituents, or has a boiling point at atmospheric pressures which coincides with or is lower than the temperature at which the process is carried out.

Although the process may be carried out at temperatures of as low as about 25° C, it is preferable to heat the reaction mixture to a temperature of from about 40° C to reflux temperature.

When the process is carried out under the preferred temperature conditions, that is at a temperature range of about 40° C to reflux temperature, the 3-phospholene isomers of the product compounds are generally observable in the reaction mixture within about one hour. When this thermally promoted reaction, which is a preferred embodiment within the scope of the process of the invention, is terminated within about 1 to 10 hours of heating, the product obtained is a 1-halo-3-phospholene substantially free of the 2-phospholene isomer. When the reaction is permitted to continue under the preferred temperature conditions for a period in excess of about 10 hours, a proportion of the product will generally be present as the corresponding 2-phospholene isomer.

The relative proportions of the two isomers obtained under the conditions of the process discussed above appear to be dependent upon the nature of the substituents $a$, $b$, $c$, $d$ and X and upon the length of time during which heat is applied to the reaction mixture.

The 1-halophospholene products of the process are generally susceptible to oxidation upon exposure to the atmosphere, particularly when they are heated. The recoverable yields are therefore improved when the reaction is carried out under an inert gas atmosphere. Illustrative of inert gases which can be used is nitrogen, employing conventional apparatus and techniques.

The recoverable product yields are also enhanced when the process is carried out under anhydrous conditions, that is by employing dried reactants and excluding moisture during the course of the reaction and subsequent product purifications.

It is preferred that a catalyst be added to the reaction mixture to promote the reaction. Phosphorus tribromide will catalyze the reaction when the phosphorus trihalide employed in the process is phosphorus trichloride. The preferred catalyst is iodine, which acts as a catalyst in the process of the invention without regard to the specific phosphorus trihalide reactant employed. When employing iodine as a catalyst in the process of the invention, it is preferable that it be added to the reaction mixture in the form of an organic charge-transfer complex. Iodine-organic charge-transfer complexes are well known, and prepared by reacting the iodine with at least an equimolar proportion of an organic compound such as benzene, toluene, xylene, cyclohexane and like organic compounds (see for example Organic Charge-Transfer Complexes, Foster, Academic Press, New York, New York, 1969 and Cromwell et al., J. Am. Chem. Soc., Vol. 72, Pg.

3825). When the preferred solvent (benzene) is employed in the process of the invention, this preferred embodiment is conveniently obtained by adding the iodine directly to the benzene solvent. The catalyst is employed in a catalytic proportion, which is generally between about 0.01 molar percent to about 2.0 molar percent based on the proportion of phosphorus trihalide reactant employed in the process.

The progress of the reaction may be followed by conventional analytical methods such as infra-red spectral analysis, vapor phase chromatography and nuclear magnetic resonance analysis. Using the latter method for example, formation of the product compounds is observed by the appearance of characteristic chemical shifts and coupling constants of the respective 1halophospholene product compounds, of formula (III).

A readily observable visual indication that reaction has occurred may also be found in the formation of an orange solid precipitate in the reaction mixture.

Upon completion of the reaction, the 1-halophospholene product compounds are separated from the reaction mixture by conventional techniques. For example, the reaction mixture can be subjected to filtration, centrifugation and like techniques to remove insoluble material. The product compounds can then be isolated from the remaining solution in pure form by conventional techniques such as by distillation, countercurrent extraction, chromatographic separation and like methods.

The system of nomenclature followed in this specification and claims is illustrated by the following examples

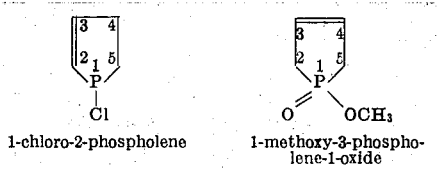

1-chloro-2-phospholene     1-methoxy-3-phospholene-1-oxide

The following examples describe the manner and process of making and using the invention, and set forth the best mode contemplated by the inventors of carrying out the invention but are not to be construed as limiting.

EXAMPLE 1

A round bottom flask is charged with 100 ml. of benzene, 35.22 gms. (0.2565 moles) of phosphorus trichloride, 28.75 gms. (0.35 moles) of 2,3-dimethyl-1,3-butadiene, 0.25 gms. of copper stearate, 5.3 gms. (0.171 moles) of white phosphorus (freshly washed with acetone and then benzene) and 0.2 gms. of iodine. While being continually stirred, the mixture is refluxed for 2 hours and then stripped of solvent and other volatiles by distillation at a temperature of circa 70° C to 80° C. The residue is distilled under reduced pressure to give 24.8 gms. (65.2 percent of theory) of 1-chloro-3,4-dimethyl-3-phospholene in the form of a colorless liquid. Redistillation gives a colorless liquid which is pure 1-chloro-3,4-dimethyl-3-phospholene having a boiling point of 59° C to 60° C/7.0 mm. of mercury.

Anal. Calc. for $C_6H_{10}ClP$ : C, 48.4; H, 6.70; P, 20.80

Found; C, 48.5; H, 6.82; P, 20.78

The assigned structure of the product is confirmed by proton nuclear magnetic resonance analysis which shows the characteristic $J_{PCH_2}$ 19.0 Hz at $\delta$ 2.50 ($C_6H_6$). The compound has $\delta P^{31}$ —111.5 (neat), relative to 85 percent phosphoric acid.

Similarly, following the above procedure, but replacing phosphorus trichloride as used therein with an equal molar proportion of phosphorus tribromide, there is obtained 1-bromo-3,4-dimethyl-3-phospholene.

EXAMPLE 2

To 20.4 gms (0.66 moles) of white phosphorus in 250 ml. benzene there is added 2.0 gms. of copper stearate, 125 ml. (1.25 moles) of isoprene, 130.4 gms. (0.95 moles) of phosphorus trichloride, 13.5 gms. (0.05 moles) of phosphorus tribromide and 0.508 gms of iodine. The mixture is refluxed for 7 hours, while being stirred continually. At the end of this period the reaction mixture comprises a clear yellow solution and an orange precipitate. The solution is decanted from the precipitate and distilled at a temperature of 70° to 80° C to remove solvent and other volatiles. The distillation residue is then distilled at a pressure of 18 mm. of Hg and at a temperature of 70° C to 73° C to give 72 gms. (53 percent of theory) of a colorless distillate which is 1-chloro-3-methyl-3-phospholene. The assigned structure of the product is confirmed by proton nuclear magnetic resonance analysis which shows the characteristic $J_{PCH_2}$ 19.4 Hz at $\delta$ 2.56 ($C_6H_6$). The compound has $\delta$ $P^{31}$ — 126.1 (neat), relative to 85 percent phosphoric acid.

Similarly, repeating the above procedure, but omitting from the reaction mixture the iodine and the phosphorus tribromide, there is obtained 1-chloro-3-methyl-3-phospholene.

EXAMPLE 3

A round bottom flask is charged with 50 ml. (0.5 moles) of isoprene, 43.8 gms. (0.319 moles) of phosphorus trichloride, 7.3 gms. (0.236 moles) of white phosphorus (freshly washed with acetone and then benzene), 100 ml. of benzene, 9.47 gms. of phosphorus tribromide, 0.18 gms of iodine and 0.75 gms. of copper stearate. The mixture is refluxed for 7 hours, while being continually stirred. At the end of this period, the reaction mixture comprises a clear yellow solution and an orange precipitate. The solution is decanted, and the precipitate washed twice with 50 ml. portions of benzene. The decanted solution and washings are combined and distilled at a pressure of 7 mm. of Hg and at a temperature of 54° C to give 2.7 gms. of a first distillate, found by proton nuclear magnetic resonance anaylsis to contain 27.8 percent (0.75 gms) of 1-chloro-3-methyl-3 -phospholene. Continued distillation at the same pressure, and at a temperature range of from 54° C to 57° C gives a second distillate which is 25.7 gms. of 1-chloro-3-methyl-3-phospholene in the form of a colorless liquid having a boiling point of 54° C/8.0 mm. of Hg. The combined product is 26.4 gms. (55.5 percent of theory) 1-chloro-3-methyl-3-phospholene.

Similarly, following the above procedure but replacing the isoprene as used therein with an equal molar proportion of the following conjugated dienes of formula (I):
1,3-butadiene;
2-chloro-1,3-butadiene;
2-(4-chloro-4-methylpentyl)-1,3-butadiene;
2-methoxy-1,3-butadiene;
4-isopentoxy-1,3-butadiene
4-phenoxy-1,3-butadiene
1,3,5-hexatriene;
7-methyl-3-methylene01,6-octadiene;
2-phenyl-1,3-butadiene and
1-bromophenyl-4-phenyl-1,3-butadiene, respectively, there are obtained:
1-chloro-3-phospholene;
1,3-dichloro-3-phospholene;
1-chloro-3-(4-chloro-4-methylpentyl)-3-phospholene;
1-chloro-3-methoxy-3-phospholene;
1-chloro-5-isopentoxy-3-phospholene;
1-chloro-5-phenoxy-3-phospholene; a mixture of
1-chloro-5-vinyl-3-phospholene and 1-chloro-2-vinyl-3-phospholene;
1-chloro-4-(4-methyl-3-pentenyl)-3-phospholene;
1-chloro-3-phenyl-3-phospholene and
1-chloro-2-p-bromophenyl-5-phenyl-3-phospholene, respectively.

EXAMPLE 4

A round bottom flask is charged with 45 ml. (0.45 moles) of isoprene, 100 ml. of benzene, 40.38 gms. (0.2941 moles) of phosphorus trichloride, 6.4 gms. (0.2064 moles) of white phosphorus (freshly washed with acetone and then benzene), 0.2 gms of iodine, 4.20 gm. (0.0155 moles) of phosphorus tribromide and 0.25 gms of copper stearate. The mixture is stirred while being refluxed for 4 hours. Solvent is then stripped from the reaction mixture by distillation at a temperature circa 70° C to 80° C, and the residue distilled at a temperature of 82° C to 85° C and at a pressure of 12 mm. to 14 mm. of mercury. The second distillate is then redistilled at a temperature of 44° C to 56° C under a pressure of 7.0 mm of Hg to give 12.6 gms. (30.2 percent of theory) of 1-chloro-3-methyl-3-phospholene in the form of a colorless liquid. The assigned structure of the product is confirmed by nuclear magnetic resonance analysis which shows the characteristic $\overline{J_{PCH_2}}$ 19.5 Hz at δ 2.60 (Benzene). The compound has δ $P^{31}$ − 126.1 (neat) relative to 85% phosphoric acid.

Similarly, following the above procedure but replacing the phosphorus trichloride as used therein with an equal molar proportion of phosphorus triiodide, there is obtained 1-iodo-3-methyl-3-phospholene.

EXAMPLE 5

A round bottom flask is charged with 40 ml. (0.4 moles) of isoprene, 100 ml. of benzene, 35.15 gms. (0.256 moles) of phosphorus trichloride, 5.6 gms. (0.180 moles) of white phosphorus (freshly washed with acetone and then benzene), 3.79 gms. of phosphorus tribromide and 0.25 gms of copper stearate. The mixture is refluxed for about 2 and one-half hours while being stirred after which an aliquot of the solution phase of the reaction mixture is taken. Proton nuclear magnetic resonance analysis confirms the presence of 1-chloro-3-methyl-3-phospholene in the aliquot by the showing of an absorbance centered at δ 2.56 PPM (Benzene) which is characteristic of 1-chloro-3-methyl-3-phospholene.

EXAMPLE 6

A round bottom flask is charged with 40 ml. (0.40 moles) of isoprene, 50 ml. of chloroform, 23.34 gms. (0.1699 moles) of phosphorus trichloride, 2.44 gms. (0.009 moles) phosphorus tribromide 3.7 gms. of white phosphorus (freshly washed with acetone and then benzene), 0.1 gm of iodine and 0.12 gms. copper stearate. The mixture is refluxed 5 hours while being continually stirred. An aliquot of the solution phase of the reaction mixture is then taken and subjected to proton nuclear magnetic resonance analysis, which confirms the presence of 1-chloro-3-methyl-3-phospholene by the showing of a characteristic $J_{PCH_2}$ 19.0 Hz at δ 2.74 (chloroform).

EXAMPLE 7

A 12 liter, 3 necked round bottom flask fitted with a means for stirring is charged with 5200 ml. of benzene and 1 lb. of white phosphorus. The air in the reaction flask is replaced with nitrogen gas, and the mixture distilled at reflux temperature to remove water, and about 200 ml. of benzene. While maintaining the nitrogen gas atmosphere, the reaction flask is additionally charged with 44.5 gms. of copper stearate, 2782 ml. (27.82 moles) of isoprene, 1847 ml. (2907 gms., 21.2 moles) of phosphorus trichloride, 105 ml. 299.5 gms.) of phosphorus tribromide and 11 gms. of iodine. the mixture is refluxed for about 5 hours under the nitrogen gas atmosphere while being continually stirred. At the end of the reflux period, the reaction mixture is distilled at a pressure of between 100 mm. of 760 mm of Hg, and at a temperature circa 40° C. The residue comprises a clear yellow solution and an orange precipitate. The solution is decanted and distilled at a temperature of 20° C to 30° C under a pressure of 30 mm. to 70 mm of mercury to remove solvent and other volatiles. Continued distillation at a temperature of 50° C to 68° C under a pressure of 8.0 to 9.0 mm. of mercury gives 1414 gms of 1-chloro-3-methyl-3-phospholene in the form of a colorless liquid having a boiling point of 54° C/8.0 mm. Hg. The assigned structure of the product is confirmed by nuclear magnetic resonance analysis which shows the characteristic $J_{PCH_2}$ 19.0 Hz at δ 2.80 (chloroform). The orange precipitate obtained in the reaction is washed with benzene and the washing combined with benzene solvent previously stripped from the reaction mixture as described above. Upon distillation of the combined benzenes, an additional 90 gms. of 1-chloro-3-methyl-3-phospholene is obtained, to give a total yield of 1504 gms. (50 percent of theory).

EXAMPLE 8

A round bottom flask is charged with 73 ml. (0.73 moles) of isoprene, 9.9 gms. (0.32 moles) of white phosphorus (freshly washed with acetone and then benzene), 145 ml. of benzene, 0.2 gms. of iodine, 0.5 gms. of copper stearate and 63.9 ml. (0.73 moles) of phosphorus trichloride. The mixture is refluxed with continuous stirring under a blanket of nitrogen gas for 30 hours. An additional 10 ml. (0.1 mole) of isoprene is added to the reaction mixture after about 23 hours of refluxing. Upon completion of the reflux period, the mixture is cooled and the supernatant liquid decanted. The residue is washed twice with 50 ml. portions of benzene. The combined supernatant and washings are distilled at a temperature of 90° C to 94° C, under a pressure of 43 mm. to 48 mm. of mercury to give 39.9 gms. of a colorless distillate which is found by proton nuclear magnetic resonance analysis to be a mixture containing 34 percent by weight of 1-chloro-3-methyl-2-phospholene and 66 percent by weight of 1-chloro-3-methyl-3-phospholene. The distillation residue (2.5 gms.) is found by nuclear magnetic resonance analysis to contain 2.1 gms. of the same 1-chloro-3-methylphospholene products (51 percent by weight of 1-chloro-3-methyl-2-phospholene and 49 percent by weight of 1-chloro-3-methyl-3-phospholene). The combined products (42.0 gms.) represent 65 percent of the theoretical yield. The assigned structure of the product compounds is confirmed by proton nuclear magnetic resonance analysis which shows $J_{PCH}$ 46.2 Hz at δ 5.95 (neat) for the 2-isomer and $\overline{J_{PCH_2}}$ 19.0 Hz at δ 2.69 (neat) for the 3-isomer The isomers have δ $P^{31}$ − 134.1 and -126.1 (neat) respectively, relative to 85 percent phosphoric acid.

EXAMPLE 9

A round bottom flask is charged with 50 ml. (0.5 moles) of isoprene, 45.3 gms. (0.33 moles) of phosphorus trichloride, 6.8 gm. (0.22 moles) of white phosphorus (freshly washed with acetone and then benzene), 100 ml. of benzene, 0.75 gms. of copper stearate and 0.2 gms. of iodine. While stirring, the mixture is refluxed for 24 hours and then distilled at a temperature of circa 70° C to 80° C to remove solvent and other volatiles. The distillation residue is then distilled at a temperature of 49° C to 56° C under a pressure of 7.0 mm. to 15.0 mm. of mercury to give 26.8 gms (60.4 percent theory) of a mixture of 1-chloro-3-methyl-2-phospholene and 1-chloro-3-methyl-3-phospholene. The assigned structure of the products is confirmed by proton magnetic resonance analysis which shows the characteristic $J_{PCH}$ 46.2 at δ 5.95 (neat) for the 2-isomer and $J_{PCH_2}$ 19.0 at δ 2.72 (neat) for the 3-isomer. Proton nuclear magnetic resonance analysis also indicates the relative proportions of the two isomers to be 6.7 percent of the 2-phospholene isomer and 93.3 percent of the 3-phospholene isomer.

The two isomers are separated by fractional distillation at a temperature of 49° C to 56° C at a reduced pressure of 7.0 mm of mercury, to give pure 1-chloro-3-methyl-2-phospholene, boiling point 64° C to 65° C/9.0 mm of Hg and pure 1-chloro-3-methyl 3-phospholene, boiling point 54° C/18.0 mm. of Hg.

EXAMPLE 10

To a round bottom flask there is charged 50 ml. (0.5 moles) of isoprene, 100 ml. of benzene, 53.025 gms (0.3862 moles) of phosphorus trichloride, 8.4 gms. (0.271 moles of white phosphorus (freshly washed with acetone and then benzene), 0.5 gms of copper stearate, 5.495 gms (0.0203 moles) of phosphorus tribromide and 0.2 gms of iodine. The mixture is refluxed for 10 hours under a blanket of nitrogen gas with continuous stirring. At the end of this period, the reaction mixture comprises a clear dark red solution and an orange precipitate The mixture is allowed to cool and the supernatant decanted. The residue is washed twice with 50 ml. portions of benzene. The supernatant and the washings are combined and distilled at a temperature circa 70° C to 80° C to remove solvent and other volatiles. The distillation residue is distilled at a temperature of 63° C under a pressure of 12 mm. of mercury to give 24.4 gms. of colorless distillate which is found by proton nuclear magnetic resonance analysis to consist of 1.0 gm. of benzene solvent and 23.4 gms of a mixture of 1-chloro-3-methyl-3-phospholene and 1-chloro-3-methyl-2-phospholene in relative proportions by weight of 73 percent of the 3-phospholene and 27 percent of the 2-phospholene isomer. the residue of the second distillation is distilled at a temperature of 71° C to 130° C under a pressure of 12 mm. of mercury to give 5.5 gms. of a distillate found by proton nuclear magnetic resonance analysis to be 69.99 percent by weight (3.5 gms.) of 1-chloro-3-methyl-3-phospholene. The total combined yield of product obtained is 26.9 gms. (49.1 percent of theory). The assigned structure of the products is confirmed by proton nuclear magnetic resonance analysis which shows the characteristic $J_{PCH}$ 46.2 Hz at δ 5.95 (neat) for the 2-isomer and $J_{PCH_2}$ 19.0 Hz at δ 2.70 (neat) for the 3-isomer in each instance wherein an analysis is made.

EXAMPLE 11

A round bottom flask is charged with 75 ml. (0.75 moles) of isoprene, 39.7 ml. (0.4545 moles) of phosphorus trichloride, 9.4 gms. (0.30 moles) of white phosphorus (freshly washed with acetone and then benzene), 150 ml. of benzene, 0.5 gms. o- copper stearate and 0.2 gms. of iodine. The mixture is refluxed for 16 hours while being continually stirred. After this period, the reaction mixture, which comprises a dark brown solution containing a solid, dark precipitate, is cooled. The supernatant is decanted and the residue washed twice with 25 ml. portions of benzene. The combined supernatant and washings are distilled at a temperature of circa 70° C to 80° C, and the distillation residue distilled at a temperature of 50° C to 56° C under a pressure of 7.0 mm. to 8.0 mm. of mercury. The distillate obtained is 42.68 gms. of a mixture found by proton nuclear magnetic resonance analysis to be 0.5 percent (0.18 gms.) benzene, 18.4 percent (7.86 gms.) 1-chloro-3-methyl-2-phospholene and 81.1 percent (34.66 gms.) 1-chloro-3-methyl-3-phospholene. The combined yield of product is 42.5 gms. (69.5 percent of theory). The structure assigned to the phospholene products is confirmed by proton nuclear magnetic resonance analysis which shows the characteristic $J_{PCH}$ 46.2 Hz at δ 5.95 for the 2-isomer and $J_{PCH_2}$ 19.0 Hz at δ 2.70 (neat) for the 3-isomer.

EXAMPLE 12

A 12 liter, 3 necked, round bottom flask fitted with a means for stirring is charged with 5000 ml. of benzene and 1 lb. of white phosphorus. The air in the reaction flask is replaced with nitrogen gas and the mixture distilled at reflux temperature to remove water. While maintaining the nitrogen gas atmosphere the reaction flask is additionally charged with 44.5 gms. of copper stearate, 2782 ml. (27.82 moles) of isoprene, 1847 ml. (2907 gms.; 21.2 moles) of phosphorus trichloride, 105 ml. (299.5 gms.) of phosphorus tribromide and 11 gms. of iodine. The mixture is refluxed for 18 hours under the nitrogen gas blanket, while being continually stirred. At the end of this reflux period, about 2 liters of solvent and other volatiles is stripped from the reaction mixture by distillation under a pressure circa 200 mm. of Hg and at a temperature of about 80° C. The distillation residue comprises a clear yellow soluand an orange precipitate. The solution is decanted and distilled under a pressure of 18 mm. to 20 mm. of Hg and at a temperature of between 35° C to 45° C to further remove solvent and other volatiles. Continued distillation under a pressure of 8 mm. of Hg and at a temperature of between 55° C to 68° C gives 1001 gms. (30 percent of theory) of a mixture of 1-chloro-3-methyl-3-phospholene and 1-chloro-3-methyl-2-phospholene, in the form of a colorless liquid. Proton nuclear magnetic resonance analysis shows that 50 percent of the product mixture is the 3-phospholene isomer and 50 percent is the 2-phospholene isomer based on the presence of $J_{PCH}$ 19.0 Hz at δ 2.75 CHCl$_3$) which is characteristic of the 3-phospholene isomer and $J_{PCH}$ 46.5 Hz at δ 6.05 (CHCl$_3$) which is characteristic of the 2-phospholene isomer. The two isomers are separated by fractional distillation under reduced pressure.

The 1-halophospholene product compounds prepared by the process of the invention are for the most part novel compounds, useful as intermediates in a number of syntheses. Illustratively, following the procedure of Hasserodt et al., Tetrahedron, Vol., 19, pps. 1563–75, (1963), for preparing phospholene-1-oxides, the 1-halophospholenes prepared by the process of the invention can be reacted with aliphatic alcohols such as methanol, ethanol, propanol, butanol, and the like or with phenol. The reaction is carried out in the presence of air and a tertiary amine acid acceptor such as a trialkylamine to give the corresponding 1-alkoxyphospholene-1-oxides, which compounds are useful as catalysts for converting isocyanates to the corresponding carbodiimides. For example, when 1-bromo-3-methyl-3-phospholene as obtained in Example 2 above is reacted with methanol in the presence of triethylamine and air, the product is 1-methoxy-3-phospholene-1-oxide, which is a known catalyst for preparing carbodiimides from isocyanates (Arbuzov et al., Doklady Akademii Nauk SSSR. Vol. 170, No. 3, pps. 585–588, Sept. 1966). Similarly 1-chloro-3-methyl-2-phospholene as obtained in Examples 8, 9, 10, 11, and 12 may be reacted with methanol following the procedure of Hasserodt et al., supra. to prepare 1-methoxy-3-methyl-2-phospholene-1-oxide which is a selective solvent for the extraction of aromatics (see U.S. Pat. No. 3,345,287).

We claim:
1. A process which comprises reacting
A. a conjugated diene capable of undergoing the Diels-Alder reaction;
B. a phosphorus trihalide selected from the group consisting of phosphorus trichloride, phosphorus tribromide and phosphorus triiodide; and
C. white phosphorus;

at a temperature of about 25° C to reflux temperature in the presence of a compound which will inhibit the polymerization of said conjugated diene (A); to obtain the corresponding 1-halophospholene.

2. The process of claim 1 wherein said reaction is carried out in the presence of an inert organic solvent.
3. The process of claim 2 wherein the inert organic solvent is benzene.
4. The process of claim 1 wherein the reaction is carried out in the presence of a catalytic proportion of iodine.
5. The process of claim 1 wherein the reaction temperature is from about 40° C to reflux temperature.
6. The process of claim 1 wherein the reaction mixture is maintained at a temperature of about 40° C to reflux temperature for a period of time sufficient to obtain a mixture of the corresponding 1-halo-2-phospholene and 1-halo-3-phospholene.
7. The process of claim 1 wherein said phosphorus trihalide (B) is phosphorus trichloride and the process is carried out in the presence of a catalytic proportion of phosphorus tribromide.
8. A process which comprises reacting
A. a conjugated diene of the formula:

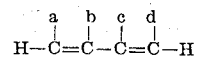

wherein a, b, c, and d are each selected from the group consisting of hydrogen, halogen, alkoxy of one to six carbon atoms, inclusive, phenoxy, hydrocarbyl and halogen substituted hydrocarbyl; said hydrocarbyl having one to six carbon atoms, inclusive;
B. a phosphorus trihalide selected from the group consisting of phosphorus trichloride, phostribromide and phosphorus triiodide; and
C. white phosphorus;
at a temperature of about 25° C to reflux temperature in the presence of a compound which will inhibit the polymerization of said conjugated diene (A); to obtain a 1-halo-3-phospholene having the formula:

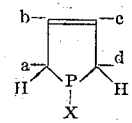

wherein a, b, c and d are as defined above; X is selected from the group consisting of chlorine, bromine and iodine, and corresponds to the halogen in the phosphorus trihalide reactant (B).

9. The process of claim 8 wherein said reaction is carried out in the presence of an inert organic solvent.
10. The process of claim 9 wherein said inert organic solvent is benzene.
11. The process of claim 8 wherein the reaction is carried out in the presence of a catalytic proportion of iodine.
12. The process of claim 8 wherein said phosphorus trihalide (B) is phosphorus trichloride, and the process is carried out in the presence of a catalytic proportion of phosphorus tribromide.
13. The process of claim 8 wherein the reaction temperature is from about 40° C to reflux temperature.

14. The process of claim 8 wherein isoprene is reacted with phosphorus trichloride and white phosphorus; and the product of the process is 1-chloro-3-methyl-3-phospholene.

15. The process of claim 8 wherein 2,3-dimethyl-1,3-butadiene is reacted with phosphorus trichloride and white phosphorus; and the product of the process is 1-chloro-3,4-dimethyl-3-phospholene.

16. A process which comprises reacting,
A. a conjugated diene of the formula:

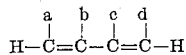

wherein $a$, $b$, $c$ and $d$ are each selected from the group consisting of hydrogen, halogen, alkoxy of one to six carbon atoms, inclusive, phenoxy, hydrocarbyl and halogen substituted hydrocarbyl; said hydrocarbyl having one to six carbon atoms, inclusive;
B. a phosphorus trihalide selected from the group consisting of phosphorus trichloride, phosphorus tribromide and phosphorus triiodide; and
C. white phosphorus;
in the presence of a compound which will inhibit polymerization of said conjugated diene (A); and at a temperature of about 40° C to reflux temperature for a time sufficient to obtain a mixture of the corresponding 1-halophospholenes of formulae:

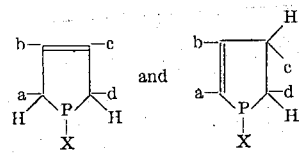

wherein $a$, $b$, $c$ and $d$ are as defined above; X is selected from the group consisting of chlorine, bromine and iodine and correspond to the halogen in the phosphorus trihalide reactant (B).

17. The process of claim 16 wherein said reaction is carried out in the presence of an inert organic solvent.

18. The process of claim 17 wherein the inert organic solvent is benzene.

19. The process of claim 16 wherein the reaction is carried out in the presence of a catalytic proportion of iodine.

20. The process of claim 16 wherein isoprene is reacted with phosphorus trichloride and white phosphorus to obtain a mixture of 1-chloro-3-methyl-2-phospholene and 1-chloro-3-methyl-3-phospholene.

* * * * *